Aug. 11, 1936.                G. B. SPEIR                2,050,741
                              WHEEL STARTER
                         Filed April 1, 1932           2 Sheets-Sheet 1

INVENTOR
Godfrey B. Speir
BY
ATTORNEY

Aug. 11, 1936.   G. B. SPEIR   2,050,741
WHEEL STARTER
Filed April 1, 1932   2 Sheets-Sheet 2

INVENTOR
Godfrey B. Speir
BY
ATTORNEY

Patented Aug. 11, 1936

2,050,741

UNITED STATES PATENT OFFICE 2,050,741

WHEEL STARTER

Godfrey B. Speir, Hempstead, N. Y., assignor, by mesne assignments, to Curtiss Aeroplane & Motor Company, Inc., a corporation of New York Application April 1, 1932, Serial No. 602,614

2 Claims. (Cl. 244—2)

This invention relates to airplanes, and more particularly to the landing wheels of airplanes.

One of the objects of my invention is to provide means to initiate rotation of the landing wheels of an airplane while the airplane is in the air, so that when the airplane lands the wheels are rotating, thus increasing tire life.

It has been noted for some time that the tires on airplane wheels, particularly on large airplanes, are subject to great wear due to landing. The landing speed of an airplane is usually from 40 to 60 miles per hour. The wheels of the airplane prior to landing are stationary, and when the initial impact of landing takes place, the wheels must attain rotation from their contact with the ground. On large wheels having large tires, wherein the weight of the wheels and tires is considerable, and hence their inertia to rotation is considerable, the tire must necessarily scrape along the ground before it rotates at a speed equivalent to the speed of the airplane traveling along the ground. This scraping wears away the rubber unevenly and causes premature wear of the tires, and also causes a safety hazard due to the likelihood of punctures or blowouts in landing. Such blowouts in landing might result in a serious accident.

It has been found in aircraft operation that on certain large airplanes, only about one hundred landings can be obtained on a set of tires due to the scraping action when the tire touches the ground. By providing means to initiate rotation of the wheels just prior to landing, this scraping effect is largely overcome and tire life is greatly increased. Most of these airplanes are equipped with brakes and the brakes are used to bring the airplane to a quick stop after it has landed. However, when the wheel is rotating and the brakes are applied, the wear is distributed evenly over the tread of the tire, so that premature wear is not caused by the brakes. The principal source of wear in aircraft tires is in the initial impact when the rubber is scraped off.

A further object of my invention is to provide a control mechanism operable by the pilot of an aircraft, to start rotation of the landing wheels just prior to landing.

A further object of my invention is to provide a compact mechanism, easily streamlined and light in weight which may be combined with a landing wheel to attain the objects above set forth.

A further object of my invention is to provide in the rotating mechanism a control means whereby the rotating mechanism may be wound or prepared for landing, locked in a wound position, and released instantly to initiate rotation. The winding operation is possible while the airplane is taxiing in a forward direction on the ground so that no reversal of the mechanism is necessary to wind it.

Further objects will be apparent from a reading of the subjoined specification and claims and from a consideration of the drawings.

In order to explain the invention more clearly, one embodiment thereof is shown in the accompanying drawings, in which.

Figure 3:
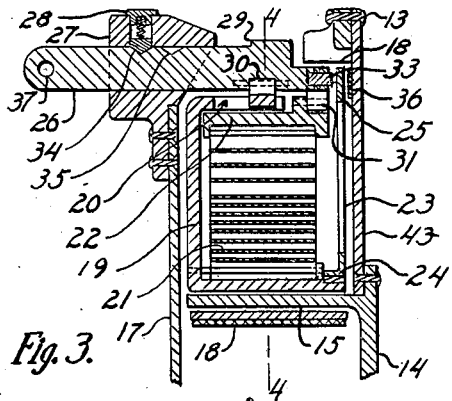
Figure 4:
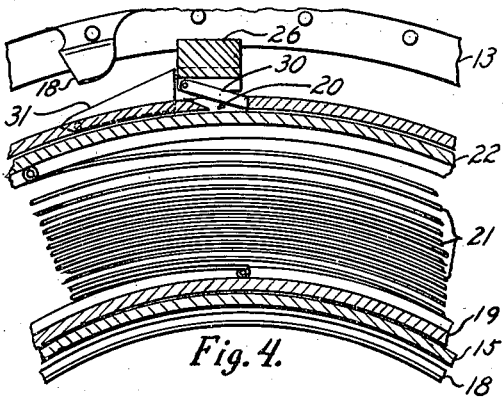
Figure 5:
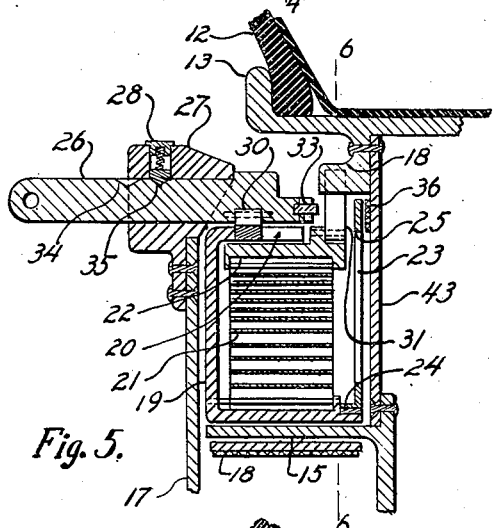
Figure 6:
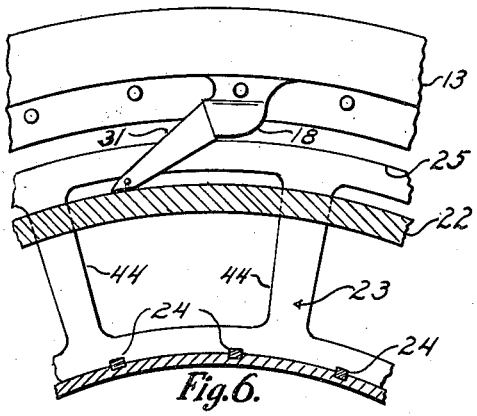
Figure 7:
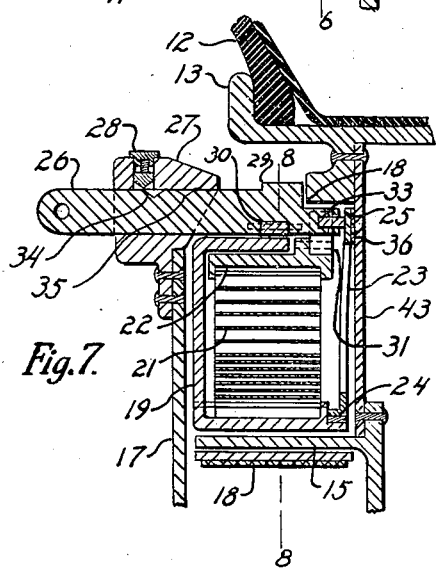
Figure 8:
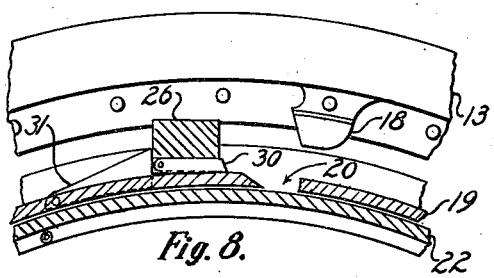

Figs. 3, 5 and 7 are detail sectional views showing the control mechanism in different positions of adjustment; and Figs. 4, 6 and 8 are sectional elevations on the lines 4—4, 6—6 and 8—8 of Figs. 3, 5 and 7, respectively.

Similar parts are indicated in various drawings by similar numbers.

Figure 1:
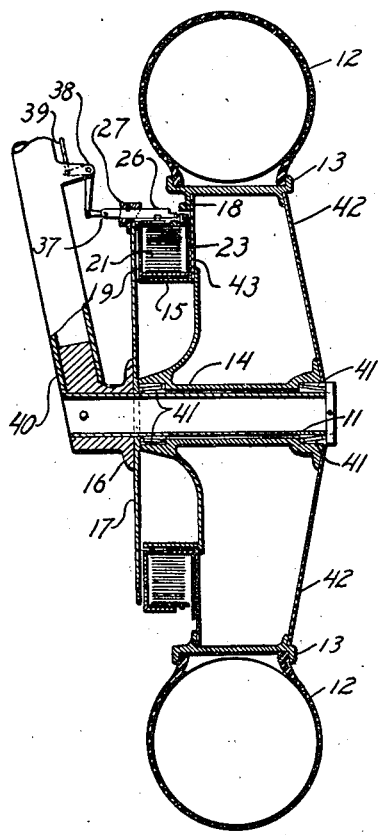
Fig. 1 is a section of an airplane landing wheel in which is included my invention.
Figure 2:
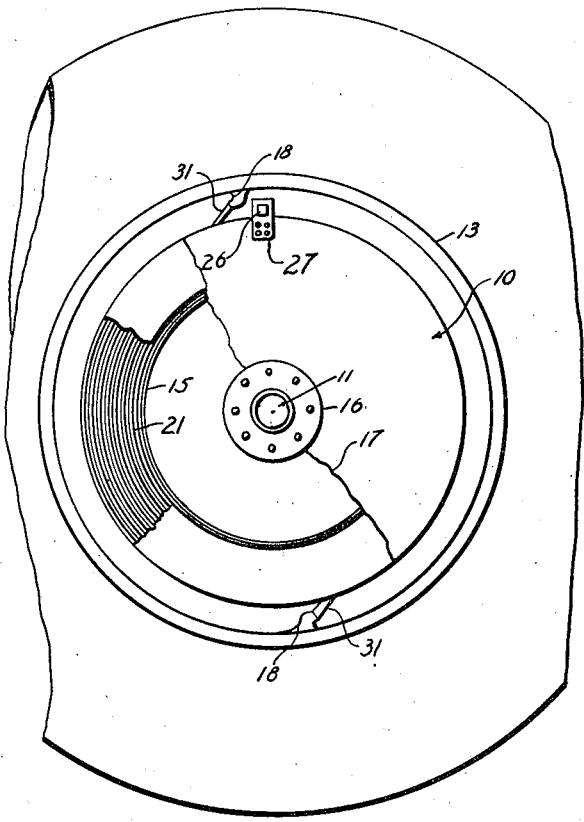
Fig. 2 is an elevation of the landing wheel of Fig. 1 with parts broken away to show the assembly.

Referring to Fig. 1, an airplane wheel 10 is shown as mounted on an axle 11 which in turn is mounted on a strut 40. Rotation and loads between the wheel 10 and the axle 11 are assumed by the bearings 41. The wheel itself comprises a hub portion 14 with spacing discs 42 and 43 which carry a rim 13 on which is mounted a tire 12. The inner flange of the hub 14 is carried radially outward from the rotational axis of the wheel 10 to support a brake drum 15. Inside of the brake drum 15 is ample space for the inclusion of a conventional brake mechanism, the bands of which are shown in Figs. 3, 5 and 7 at 18. The brake mechanism is anchored on an anchor plate 17 supported by a flange 16 on the strut 40.

Exterior of the brake band 15 is located an annular channel member 19, which is free to rotate on the exterior surface of the brake drum 15. The annular channel member 19 comprises a cylindrical portion parallel to the axis of the wheel and bearing upon the brake drum 15, a radial ring portion and an outer cylindrical portion turning in toward the wheel. A spiral spring 21 similar to a clock spring is attached at its inner end to the annular channel member 19, so that the leaf of the spring 21 retreats from the direction of rotation of the wheel. A ring 22 is positioned within the outer flange of the channel member 19 and is free to rotate with respect thereto. The other end of the spring 21 is attached to the ring 22 as shown in Fig. 4. A flexible wheel 23 is keyed at the points 24 to the inner portion of the channel member 19 and thus rotates with said member. This wheel is made in the form of a spoked wheel having at its outer periphery a rim 25 supported by the spokes 44. The rim 25 is adapted to be deflected to come in contact with a friction lining 36 attached firmly to the wheel disc 43. Thus, it will be seen that the channel member 19, housing the spring 21 and the outer ring 22 fastened to the spring 21, is adapted to turn as an independent unit with respect to the wheel. Likewise, the outer ring 22 may turn with respect to the channel member 19, with the spring 21 joining these two elements so that any movement between the channel member 19 and the ring 22 is proportional to the tension in the spring 21.

A control mechanism for the spring, channel member and ring is formed by an anchor block 27 fixed to the brake anchor plate 17. In this anchor block is positioned a control bar 26 arranged to slide through the block 27 in a direction parallel to the wheel axis. At the inner end of the control bar 26 is a pivot 37 connected to a bell crank 38 pivoted in the strut 40, from which a control rod 39 passes to the cockpit of the airplane within reach of an occupant thereof. To the control bar 26 is pivoted a pawl 30 which is adapted to engage in a slot 20 cut in the outer flange of the channel member 19. By means of this pawl, the channel member 19 is allowed to rotate in a direction similar to the direction of normal rotation of the wheel, but is prevented from rotating in the opposite direction by the engagement of the pawl 30 within the slot 20. On the outer surface of the ring 22 is pivoted a pawl 31. In its locked and winding positions, the pawl 31 lies close to the ring 22 as shown in Figs. 3, 4, 7 and 8, and engages the control bar 26 so that rotation of the ring 22 in the direction of wheel rotation is prevented. Upon slidably withdrawing the control bar 26 as shown in Fig. 5, the bar is disengaged from the pawl 31 allowing the outer ring 22 to rotate in the direction of the wheel rotation. The pawl 31 is adapted to swing radially outward about its pivot by centrifugal force due to rotation of the ring 22, when the control bar 26 has been withdrawn. Upon its outward extension, the pawl 31 engages with the lugs 18 formed as part of the rim 13 of the wheel 10, as shown in Figs. 5 and 6.

The control bar 26 is adapted to slide toward the wheel 10 so that the roller 33 at the inner end of the control bar 26 may engage the rim 25 of the flexible wheel 23. By pressing the control bar 26 against the rim 25, the rim 25 as shown in Fig. 7 engages the friction lining 36 on the wheel disc 43.

In the anchor block 27 is located a spring keeper 28 adapted to engage in the notches 34 and 35 in the control bar 26.

Operation of the device involves three positions and three functions. The first function shown in Figs. 3 and 4 is that of locking the mechanism out of engagement with the wheel, and also of locking the spring in a wound condition. In Fig. 3 it will be seen that the control bar is located so that the keeper 28 engages in the notch 34. The pawl 30 carried by the bar 26 engages in the slot 20 in the channel 19, preventing counter-clockwise motion of said channel under the influence of the spring 21. The pawl 31 on the ring 22 engages the control bar 26, preventing clockwise rotation of the ring 22, which rotation is urged by the spring 21. This is shown in section in Fig. 4, indicating also that the wheel rim and its lug 18 is free to rotate with respect to the spring motor comprised by the channel member 19, the spring 21 and the ring 22.

The second function of the device is to allow release of the spring motor to cause initial rotation of the wheel. This would be done by an occupant of the airplane prior to making a landing, so that when the wheels contact the ground, they will be rotating. The position of the control mechanism is shown in Figs. 5 and 6. The control bar 26 is withdrawn so that the keeper 28 registers with the notch 35 in the control bar. As an additional safety factor, a stop 29 abuts the anchor block 27 to prevent withdrawal of the control bar 26. In this position of the control bar, its inner end carrying the roller 33 is withdrawn free of the pawl 31, allowing the outer ring 22 to be rotated by means of the tension of the spring 21. In this position, likewise, the pawl 30 continues to engage in the slot 20 thereby holding the inner end of the spring 21 against reactional rotation. Upon rotation of the outer ring 22, the pawl 31 is thrown outward by centrifugal force and thus engages the lug 18 on the rim 13 of the wheel 10, thus causing rotation of the wheel. The spring impels rotation of the wheel until its energy is exhausted, or until the landing wheels contact with the ground and are caused to rotate by the movement of the airplane with respect thereto. Upon exhaustion of the energy in the spring, although the wheel may continue to rotate, the rim lugs 18 will overrun the pawl 31, knocking it back into its position adjacent the ring 22 and thus allowing the ring 22 to come to rest although the wheel may still be rotating. At this time, the control bar 26 may be moved to the locked position shown in Fig. 3 or may be moved to the position to induce rewinding of the spring, shown in Fig. 7. If desired, a spring resilient enough to be overcome by centrifugal force may be located adjacent to the pawl 31 to hold it normally against the ring 22.

The rewinding operation may be conducted while the airplane is taxiing along the ground, wherein positive rotation of the wheel is assured by its rolling under the power of the engine and propeller. The control bar 26 is thrust inward, so that the roller 33 engages the rim 25 of the flexible wheel 23, pushing it against the friction lining 36. In this position of the control bar, the outer ring 22 is locked against clockwise rotation, since the pawl 31 engages the control bar 26. The contact of the flexible wheel 23 with the friction lining 36 causes rotation of the channel member 19 in a clockwise direction, through the fact that the wheel 23 is keyed to the channel member at the point 24. Rotation of the channel member is possible through the disengagement of the pawl 30 from the slot 20. This causes winding of the spring. When a sufficient degree of tension is reached in winding the spring, pressure may be relaxed upon the control bar 26 thus allowing disengagement of the friction surfaces, whereupon the pawl 30 will immediately engage in the slot 20 and lock the spring motor in a wound position. Slight retraction of the control bar 26 permits engagement of the keeper 28 in the notch 34, thus setting the mechanism in the same position shown in Fig. 3. As above mentioned, when the keeper 28 engages in the notch 34, the spring motor is held in a locked and wound position and is likewise entirely out of engagement with the wheel so that the latter is free to rotate for taking off and so that the brakes 18 may be applied in a normal manner against the inside of the brake drum 15. This, in effect, gives a spring motor for initiating rotation of the wheels in the air and allows winding and locking of the spring motor while taxiing on the ground, all functions—releasing, winding and locking being possible with continuous forward rotation of the wheel.

The embodiment shown comprises essentially a spring motor and control means for operating it. I do not wish to limit my invention, however, to a spring motor. Electric motors, inertia starters and similar devices may be used with beneficial effect to accomplish the objects set forth, namely, to provide a means for initiating rotation of the wheel in the air, and prior to landing, to minimize tire wear. By my device I eliminate continuous rotation of the wheel in the air, which rotation is unnecessary, and causes unnecessary wear on and throwing off of lubricant from the wheel bearings.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an airplane, a landing wheel; a spring motor comprising a spring, an annular channel member embracing said spring and adjacent to and revoluble with respect to said wheel, means for engaging said channel member in driven relation to said wheel, an outer ring attached to said spring, and means to connect said outer ring in driving relation to said wheel.

2. In an airplane, a landing wheel; a spring motor comprising a spring, an annular channel member embracing said spring and adjacent to and revoluble with respect to said wheel, means for engaging said channel member in driven relation to said wheel, an outer ring attached to said spring, means to connect said outer ring in driving relation to said wheel; and control means selectively operable to effect said driven relation, said driving relation, and to lock said engaging means and said connecting means out of engagement with said wheel.

GODFREY B. SPEIR.